United States Patent [19]

Wafer et al.

[11] Patent Number: 4,660,009
[45] Date of Patent: Apr. 21, 1987

[54] MODULAR INTEGRAL CIRCUIT INTERRUPTER

[75] Inventors: John A. Wafer, Brighton Twp.; Kurt A. Grunert, Beaver, both of Pa.

[73] Assignee: Westinghouse Electric Corp., Pittsburgh, Pa.

[21] Appl. No.: 759,718

[22] Filed: Jul. 29, 1985

[51] Int. Cl.[4] ............ H01H 77/06; H01H 83/22
[52] U.S. Cl. ............................................. 335/6; 335/16
[58] Field of Search ............ 335/14, 16, 195, 6, 335/18; 361/115

[56] References Cited

U.S. PATENT DOCUMENTS

| | | | |
|---|---|---|---|
| 3,638,157 | 1/1972 | Kruzic | 337/6 |
| 4,025,883 | 5/1977 | Slade et al. | 335/16 |
| 4,037,183 | 7/1977 | Gaskill | 335/18 |
| 4,042,895 | 8/1977 | Wafer et al. | 335/16 |
| 4,077,026 | 2/1978 | Slade et al. | 335/195 |
| 4,540,961 | 9/1985 | Maier | 335/16 |
| 4,551,697 | 11/1985 | Kussy | 335/16 |

FOREIGN PATENT DOCUMENTS

| | | | |
|---|---|---|---|
| 1185703 | 1/1965 | Fed. Rep. of Germany | 335/195 |
| 1788148 | 5/1973 | Fed. Rep. of Germany | 335/195 |
| 1692 | 1/1970 | Japan | 335/16 |
| 112822 | 5/1966 | Netherlands | 335/195 |

Primary Examiner—Charles Frankfort
Assistant Examiner—W. Morris Worth
Attorney, Agent, or Firm—L. P. Johns

[57] ABSTRACT

A circuit interrupter characterized by an assemblage of interconnected electrical units including a circuit breaker, a current limiting structure, a contactor, and a motor controller which units are fitted together detachably into a compact unit, in which the controller controls the contactor and the circuit breaker in response to a predetermined current condition, and in which the circuit interrupter includes a single pair of separable contacts.

17 Claims, 10 Drawing Figures

MODULAR INTEGRAL CIRCUIT INTERRUPTER

CROSS-REFERENCE TO RELATED APPLICATION

This application is related to the copending application, Ser. No. 670,792 filed Nov. 13, 1984 entitled "Magnetically Operated Circuit Breaker" of which the inventors are C. J. Heyne and N. A. Tomasic; and Ser. No. 759,719, filed July 29, 1985, entitled "Circuit Breaker with Separable Modules", of which the inventors are W. V. Bratkowski and J. A. Wafer, both assigned to the assignee of this application.

BACKGROUND OF THE INVENTION

1. Field of the Invention

This invention relates generally to circuit breakers and, more particularly, to a circuit interrupter characterized by a modular construction and including a circuit protector/motor starter with features of plug-in and rating changes with ease of installation and maintenance.

2. Description of the Prior Art

A typical motor circuit has had control and protective devices including discrete components to switch, detect overloads and faults, provide interlocking to other controllers, and have been permanently fixed to mounting locations. This type of circuit design has required extensive technical knowledge to properly apply and coordinate these devices from the load to the source. Maintenance has usually been cumbersome and time-consuming in the event that replacement, normal inspection, or emergency repairs were necessary. Accordingly, there is a need for an integrated electrical switchgear design in which discrete components for monitoring, switching, interrupting and communication elements are conveniently contained within a compact module with advanced state of the art operating features.

SUMMARY OF THE INVENTION

In accordance with this invention a circuit interrupter is provided which comprises an electrically insulated housing including a bottom wall, a circuit breaker having first and second separable contacts operable between open and closed positions, the circuit breaker including a trip mechanism having a releasable lever movable when released to a tripped position to cause automatic opening of the contacts, the first contact being mounted on a first arm coupled to the releasable lever, the second contact being mounted on a second arm of which at least a portion is substantially parallel to the first arm to cause current limiting repulsion of the contacts in response to overcurrent conditions, electromagnetic actuating means detachably connected to the second arm for moving the second contact between open and closed positions of the first contact, the electromagnetic actuating means including linkage means connected to the second arm and comprising pin and a pin-receiving slot (or equivalent function) to enable uninhibited movement of the second arm in response to current limiting repulsion between the contacts, modular sensor means detachably mounted for monitoring current flow and for automatically actuating the electromagnetic actuating means and releasable lever in response to another predetermined overload condition, the assembly of the circuit breaker, modular sensor means, and electromagnetic actuating means comprising one pair of contacts, whereby the circuit breaker is operable either with or without at least one of said means.

The circuit interrupter of this invention provides a modular construction combination of a circuit breaker, motor starter, and contactor in which the modular parts are detachably mounted to enable removal and replacement where necessary for the particular installation involved. One advantage is that a single pair of contacts are used for the functions of a circuit breaker and a contactor and at the same time current limiting advantage is provided. This device can also be used as a remotely controllable breaker to replace a conventional breaker with an add-on electric operator, or a stored energy breaker with mother charge.

DESCRIPTION OF THE PREFERRED EMBODIMENTS

Figure 1:
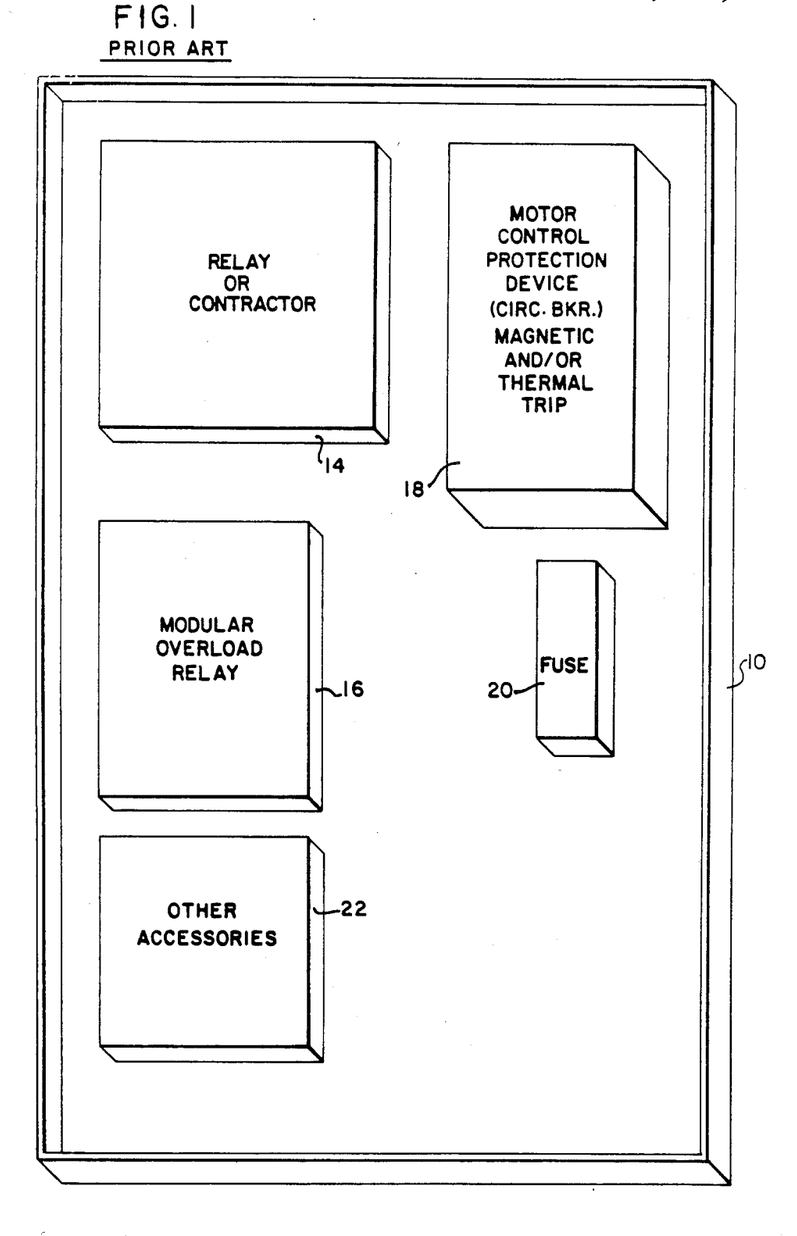
FIG. 1 is a schematic view showing prior art assembly of several parts contained within a conventional metal box mounted on a panel or wall.

In FIG. 1 is shown a prior art assemblage of several parts for preventing downstream damage to electrical equipment and includes a panel or motor control center metal box 10 for containing required electrical devices, such as a relay or contactor 14, a modular overload relay 16, a motor control protection device 18 such as a circuit breaker, a fuse 20, and other accessories 22. The several devices 12-22 are disposed in spaced relationship with respect to each other within the box 10 and are electrically connected together as required. Suffice it to say this prior art combination occupied considerable space wherever located such as in an enclosure. It is the purpose of this invention to reduce the size and weight of the combination of the several parts 10-22 as presently used, such as set forth hereinbelow.

Figure 2:
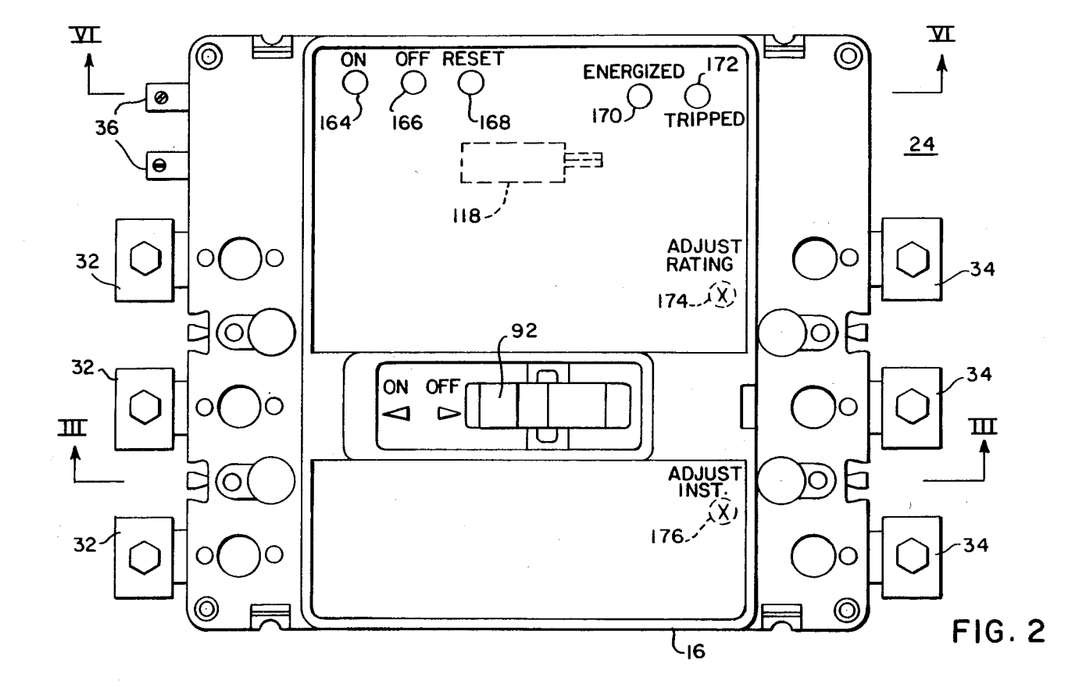
FIG. 2 is a plan view of the upper surface of the circuit interrupter.
Figure 3:
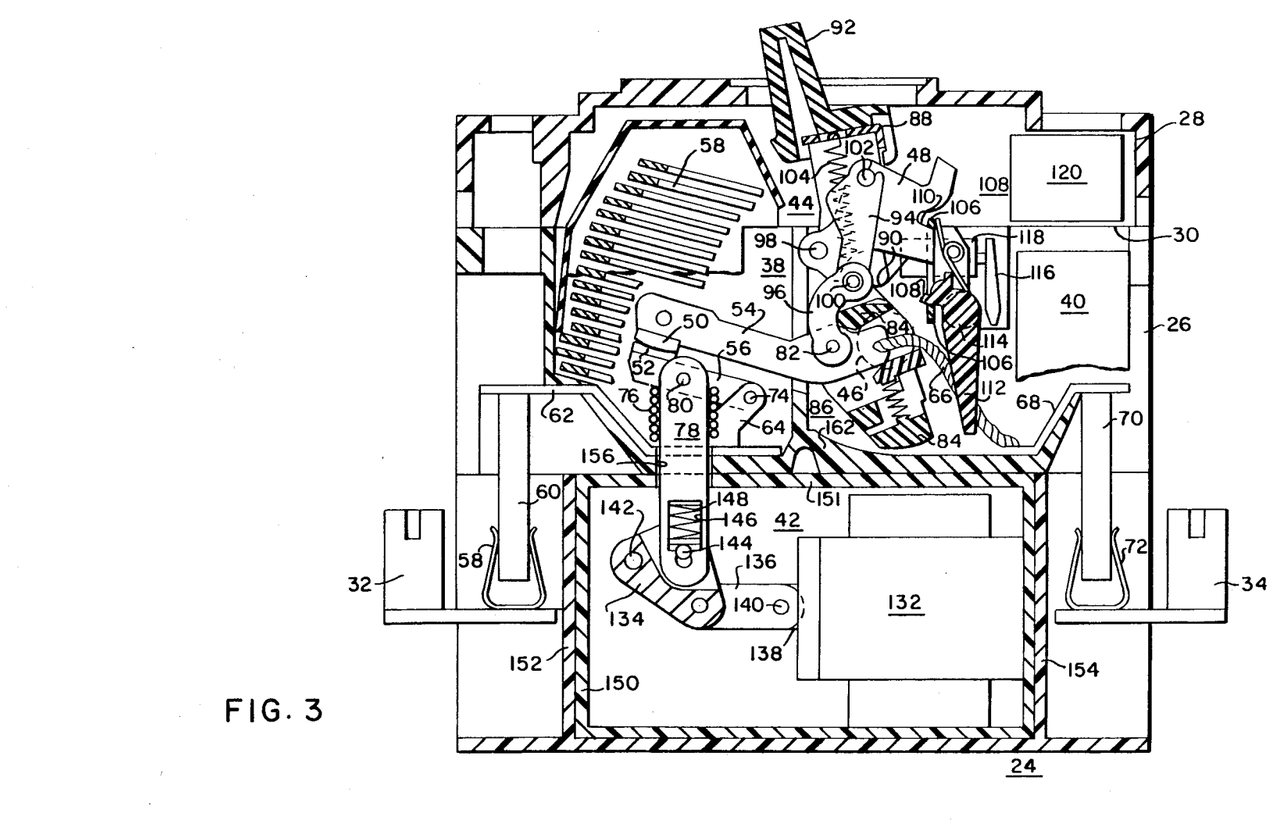
FIG. 3 is a vertical sectional view taken on the line 3—3 of FIG. 2 showing the circuit breaker in the closed circuit condition.

In FIGS. 2 and 3 a molded case circuit interrupter is generally indicated at 24 and includes a molded, electrically insulating housing or base 26 having a cover 28 which is mechanically attached at a parting line 30 where it is retained in place by a plurality of fasteners such as screws (not shown). A line terminal 32 is disposed at one end of the housing 26 and a load terminal 34 is disposed at the other end. The circuit interrupter 24 may be used either as a single phase or a polyphase structure such as a three phase or three pole circuit interrupter. For a poly phase circuit breaker, a pair of similar terminals 32, 34 are provided for each phase. The terminals 32, 34 are employed to serially electrically connect the circuit interrupter 24 into an electrical circuit, such as a three phase circuit, to protect the electrical system involved. It is pointed out, however, that space as indicated by bracket 36 can be provided for one or more additional phases as necessary. In this case, it is wise to have an electronic trip system.

As shown in FIG. 3, the circuit interrupter 24 includes a circuit breaker generally indicated at 38, a modular sensor or current transformer module 40, and an electromagnetic actuator 42. The circuit breaker 38 comprises an operating mechanism 44, a tie bar 46, a cradle or releasable lever 48, and a pair of separable contacts 50, 52 mounted on upper and lower contact arms 54, 56. When the contacts 50, 52 are closed, a circuit through the circuit interrupter extends from the terminal 32, through a receptacle 58, a stab conductor 60, a conductor 62, a mounting bracket or shunt connection 64, the parts 56, 52, 50, 54, a shunt 66, a conductor 68, a stab conductor 70 and a receptacle 72 to the terminal 34.

The lower contact arm 56 is pivotally mounted on the bracket 64 by a pin 74 and is retained in the upper position by a coil spring 76. In addition, a link 78 is pivotally connected by a detachable pivot pin 80 for lowering the contact 72 when necessary as set forth herein below. The upper contact arm 54 is pivotally connected at a pin 82 to a rotating carriage 84, which is secured to or integral with the insulating tie bar 46. The contact arm 54 and the carriage 84 accordingly rotate as a unit with the tie bar 46 during normal current conditions through the circuit breaker 38.

The operating mechanism 44 is positioned in the center pole unit of a three pole circuit breaker and is supported between spaced plates (one of which plates 86 is shown) which are fixedly secured to the base of the housing 26 at the center pole unit. An inverted U-shaped operating lever 88 is pivotally supported on the plates 86 with the ends of the legs of the lever supported in U-shaped notches 90 of the plates.

The U-shaped operating lever 88 has a handle 92 for manual operation of the mechanism 44. The mechanism 44 also comprises an overcenter toggle having an upper toggle link 94 and a lower toggle link 96 which connect the contact arm 54 to the releasable lever 48 that is pivotally supported on plate 86 by means of a pin 98. The toggle links 94, 96 are pivotally connected by means of a knee pivot pin 100. The toggle link 94 is pivotally connected at pin 102 to the cradle 48 and the link 96 is pivotally connected to the rotating carriage 84 at the pivot point 82. Overcenter operating springs 104 are connected under tension between the knee pivot pin 100 and the bight portion of the lever 88.

Contact 50 is normally manually moved to the closed position by movement of the handle 92 in a leftward direction (FIG. 1) from the OFF to the ON position. That operation obtains so long as a latch lever 106 of a trip bar assembly 108 is lodged in a notch 110 of the cradle 48. The trip bar assembly 108 includes a plurality of trip bars 112, such as three, one for each phase. The trip bars are preferably comprised of molded electrically insulating material and are either fixedly mounted or an integral part of a trip bar axial 114. The trip bar assembly also comprises a trip lever 116 and a solenoid 118. When the solenoid 118 is actuated, the solenoid plunger rotates the trip lever 116 so that the lower end rotates the trip bar 112 clockwise, causing the lower end of the latch lever 106 to move off of the surface 110 of the releasable lever or cradle 48. Contact arm 56 is actuated and moved to the closed position when electromagnet 132 is energized.

For the purpose of this invention, the circuit breaker operating mechanism 44 is tripped solely by the solenoid 118 (FIG. 8) in response to a signal from a trip unit 120 which in turn is connected to a coil 122 in the modular sensor 40. The coil 122 (FIG. 8) encircle the conductor 68 (FIG. 3) for monitoring the current flow therethrough. When a predetermined overload current passes through the conductor 68, the solenoid trips the operating mechanism 44. For that purpose the trip unit 120 includes a diode 124 and a resistance 126. A coil 128 of the solenoid 118 is connected to the circuit in the trip unit whereby a solenoid plunger 130 is actuated against the trip lever 116.

Figure 8:
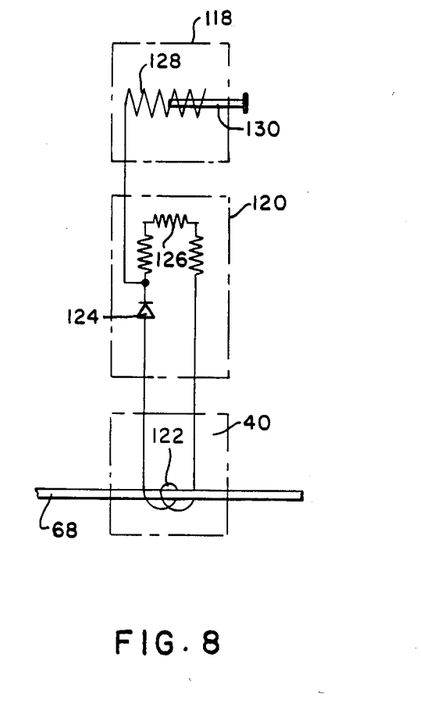
FIG. 8 is a diagram of an electrical circuit for a module, trip unit and solenoid as provided in this invention.

The modular sensor 40 is detachably mounted within the housing 26 of the circuit interrupter 24, whereby it is removably mounted for replacement by a modular sensor of a different rating, or by a unit having overload current monitoring means, such as a bimetal or thermal magnetic devices. The trip unit 120 is preferably disposed within the cover 28 (FIG. 3) where it is electrically connected to the sensor 40. In the alternative the trip unit may be an integral part of the modular sensor 40 particularly where the sensor is of the type having the coil 128 (FIG. 8).

In addition to operating the solenoid 118 and thereby tripping the operating mechanism 44 of the circuit breaker, the modular sensor 40 is also connected to a solenoid 132 for actuating the electromagnetic actuator 42. The purpose of the solenoid 132 is to lower the contact arm 56 when de-energized (FIG. 3) through linkage means including the link 78, a cross bar 134, a link 136 to which a plunger 138 of the solenoid is pivotally connected at 140. The cross bar is common for all phases of the circuit interrupter, and is pivotally mounted at 142. The link 78 is pivotally connected to the cross bar 134 by a pin 144 and the link includes a slot 146 in which a spring 148 is disposed to function with the pin 144 to relieve any overtravel of the linkage.

The solenoid 132 is not only responsive to a signal from the modular sensor 40 for lowering the contact 52, but it is also responsive to signals from remote locations for opening and closing the contacts. The solenoid 132 having a coil for a particular voltage in cooperation with the predetermined overload or short circuit threshold of the modular sensor 40, is removable and replaceable to accommodate any other desired voltage range and in cooperation with the modular sensor 40.

More particularly, the modular sensor means including the modular sensor 40 and the trip unit 120 are discrete units which are detachably mounted for removal and replacement. Similarly, the electromagnetic actuator 42 including the solenoid 132 and the associated linkage is likewise a discrete unit which is preferably contained within a housing or a casing 150 which is preferably detachable disposed in a suitable manner such as between spaced walls 152, 154. The link 78 extends through an opening 156 which is preferably sealed to prevent the escape of arc gases and debris occurring when the contacts 50, 52 are separated. The link 78 may be detached at either of the pins 80, 144.

To avoid or minimize the effect of shock, such as occurs on board a naval vessel, a land tank, or due to seismic vibrations caused by an earthquake, the cross bar 134 is weighted to serve as a counterbalance between the movable armature or plunger 138 and the lower contact arm 56 which is biased by the coil spring 76. Thus, the link, besides operating the lower contact arm 56 serves as a means to counterbalance for shock resistance operation whether in the deenergized or energized conditions (FIGS. 3 and 4), due to the weighted cross bar 134.

In view of the modular construction composed of the discrete units of the circuit breaker 38, the modular sensor 40, and the electromagnetic actuator 42, a combination of functions may be provided including either the circuit breaker alone, the circuit breaker with the sensor 40 and without the electromagnetic actuator 42, or the circuit breaker with the electromagnetic actuator and without the modular sensor 40.

Figure 4:
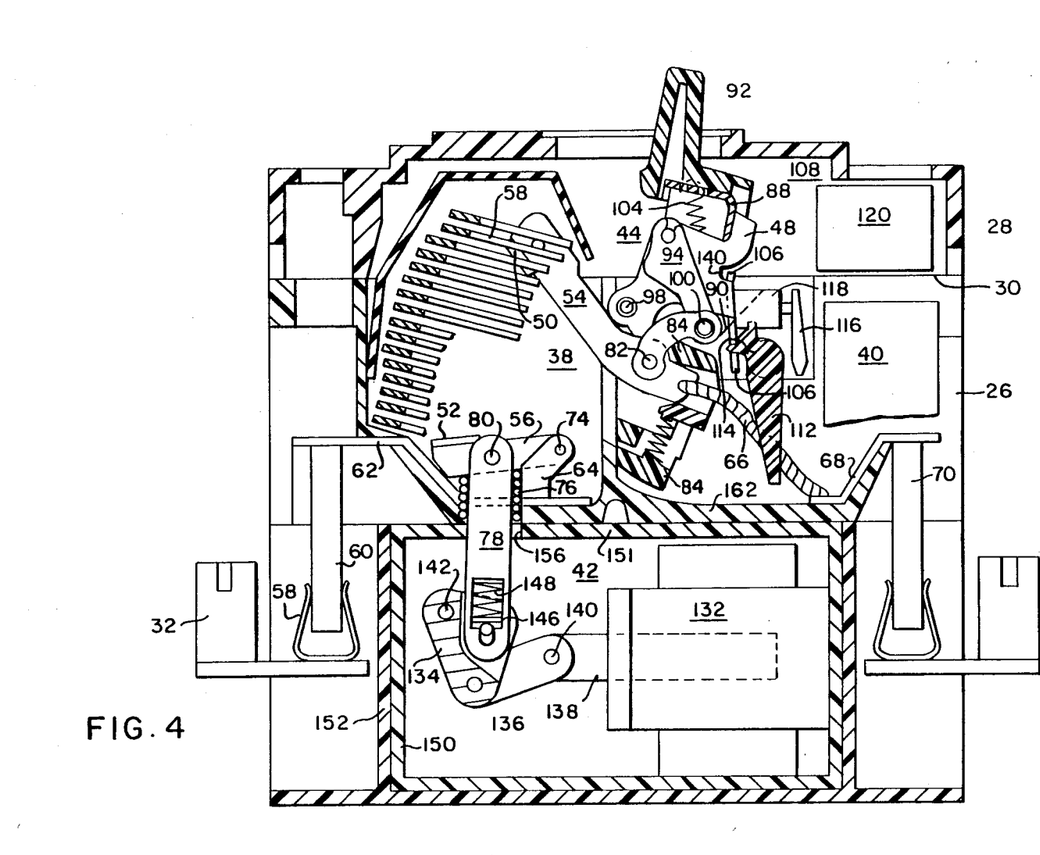
FIG. 4 is a vertical sectional view similar to that of FIG. 3 but showing the circuit breaker in the open circuit condition.

In the first circumstance where the circuit breaker functions alone, it is operable by manual movement of the handle 92 to open the contacts by raising the contact arm 54 (FIG. 4), but without lowering the lower contact arm 56 as shown in FIG. 4. Thus the contact is moved through an arc chute 58 in a conventional manner to eliminate any arc occurring between the separating contacts. In addition, the parallel positions of the upper and lower contact arms 54, 56 render the circuit breaker susceptible to current limiting conditions, whereby upon the occurrence of a high level short circuit the contacts 50, 52 blow open (FIG. 5A) to separate from their normally closed positions as indicated by an imaginary line 160. Under such circumstance were the link 78 is disconnected at the pin 80 from the contact arm 56, a wall 151 of the housing 150 is replaced by a panel (not shown) of similar structure to cover the opening 156 in the bottom wall 162 of the housing 26.

In the second circumstance, where the circuit breaker 44 is used in conjunction with the modular sensor 40 and without the electromagnetic actuator 42, the circuit breaker may function in addition to the conditions set forth with regard to the circuit breaker alone into the predetermined overcurrent conditions to which the modular sensor 40 is susceptible for actuating the solenoid 118. Due to the modular construction of the sensor 40 it is readily detachable for removal and replacement of sensors 40 of different current ratings as required. Thus the modular sensor 40 adds additional functions to the circuit breaker 44 including tripping of the circuit breaker in response to overcurrent conditions other than high level short circuits which cause the contacts 50, 52 to blow open in response to current limiting conditions.

Figure 5A:
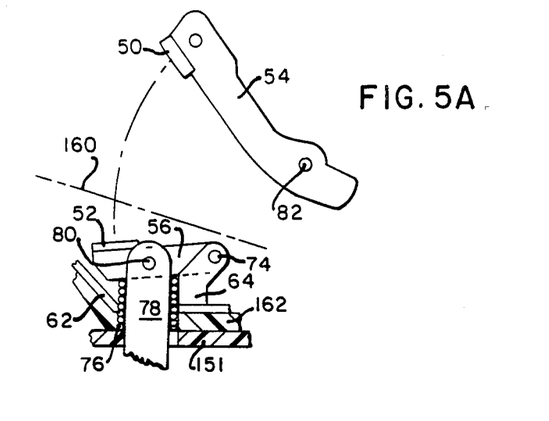
FIGS. 5A, 5B, and 5C show alternate positions of the contacts in any possible operating condition.
Figure 5B:
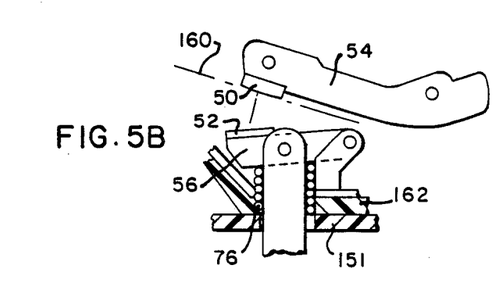
Figure 5C:
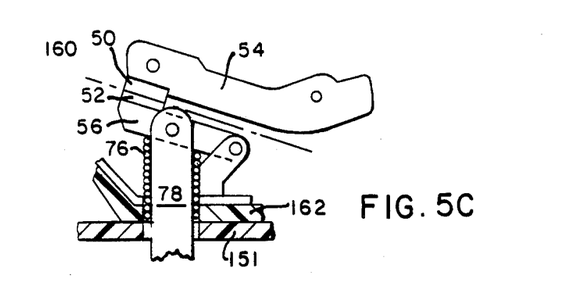

In the third circumstance with the circuit breaker 44 operating with the electromagnetic actuator 42, and with the modular sensor 40 inoperative or removed, the functions include manual operation of the circuit breaker by the handle 92. The electromagnetic actuator 42 additionally functions to open the contacts from the closed position (FIG. 5C) to the open position (FIG. 5B) with the the contact 50 remaining in the position of the imaginary line 160. This function of the electromagnetic actuator 42 may occur in response to a de-energizing signal from a remote location, such as a public utility computer. Finally, in the third circumstance with the electromagnetic actuator 42 installed and without the modular sensor 40 in place, the contacts 50, 52 are free to blow open in response to high level short circuit conditions as shown in FIG. 5A.

It is pointed out that the circuit interrupter of this invention is susceptible to a variety of operating conditions due to the modular concept of combining discretely independent units for different functions. This provides the advantage of combining the units which are available from self storage, and without the necessity of providing an entire unit for each combination of functions. Thus, customer and factory rating changes are possible rather than being only a factory supplied specific valued unit. There is the additional advantage of providing all of the several functions with only one pair of contacts 50, 52. As compared with prior combinations such as shown in prior art FIG. 1 in which several pairs of contacts are necessary, such as for a circuit breaker and a contactor, etc.

The circuit interrupter 24 consists of the sensing, switching, interrupting, and communication functions conveniently contained in a compact module, with advanced state of the art operating features. The face or top surface of the cover 28 is in effect an operating panel in which the several functional modes are displayed. Local and remote normal switching and reset functions are accomplished by face mounted switches, while an adjustment of operating current (overload and/or interruption trip values) can be made utilizing plug-in or discretely variable components. This involves the alternate use of the fourth power space 36 and involve options of an interrupter contact or straight through conductor (neutral conductor), or additional auxiliary switches to be utilized when required for secondary connections, such as power for the solenoid, position indicators for the electromagnetic actuator, remote reset, remote OFF and ON indication. Lights and/or lighted pushbuttons 164, 166 control the coil for the solenoid 132. A reset light 168 indicates that the circuit breaker 44 must be reset after a trip. A light 170 identifies the position of the lower contact arm 56 when operated by the solenoid 132. This enables a viewer to a certain normal operation, or in the event of welded contacts, a need for maintenance of the mechanism.

A light 172 indicates that the breaker is in fact in the tripped condition. A button 174 is provided for adjusting the full load current of the circuit breaker. A button 176 is provided for address adjusting the trip level of the circuit breaker.

Figure 7:
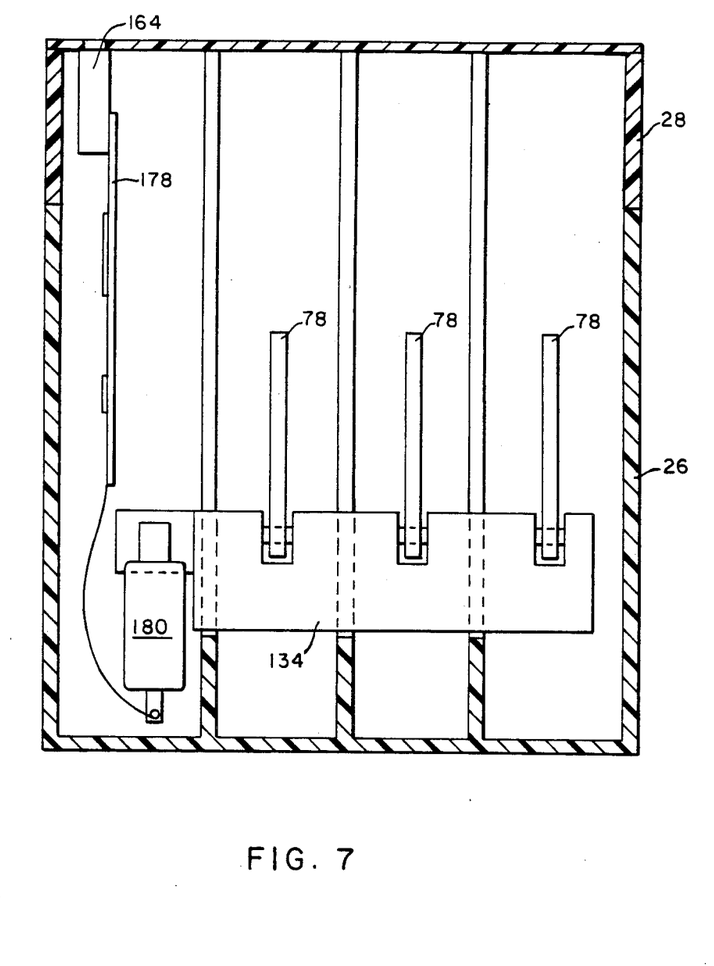
FIG. 7 is a fragmentary sectional view taken on the line 7—7 of FIG. 6.

As was indicated above, the secondary switches and wiring therefore are optionally located in the optional space 36 and the assembly of the switches (FIG. 7) includes a printed circuit board 178.

Figure 6:
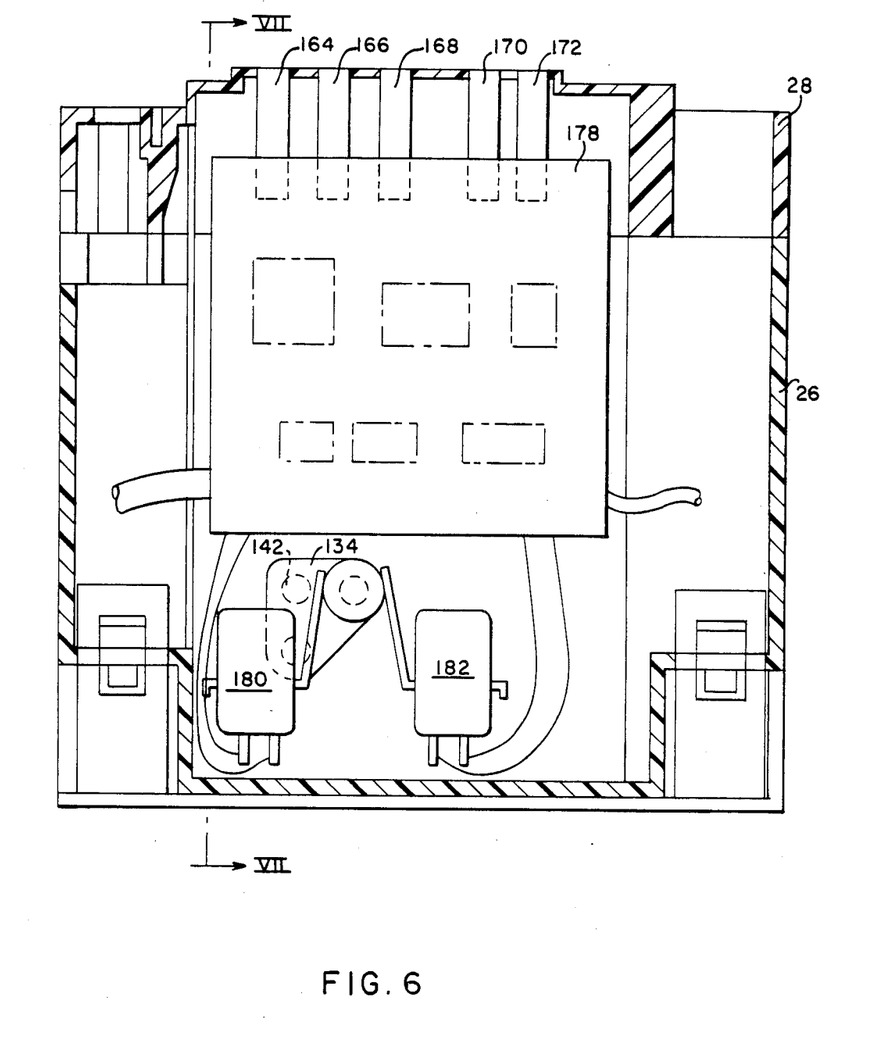
FIG. 6 is a vertical sectional view taken on the line 6—6 of FIG. 2.

A pair of auxiliary switches 180, 182 (FIG. 6) such as microswitches are disposed at the end of the cross bar 134 remote from the end shown in FIG. 2. Although two switches are used one or more than two may be provided as necessary auxiliary switches for operating when the cross bar operates. The switches may be used for remotely operating another indicating light such as whether or not the solenoid 132 is ON or OFF. Another switch may be used to reverse a motor associated with the circuit interrupter.

The circuit board 178 consists of terminals and receptacles. By this construction, wiring can be completed and the auxiliary switching mechanism plugged. This structure enables a quick change system for maintenance, rating changes, or inspection and functional checks without the need to deenergize the entire panel and disrupt service.

Accordingly, the circuit interrupter of this invention provides for a modular combination of discrete units which combination comprises a single circuit breaker for both switching and interrupting a line current. The assembly of the modules provide for different functional capabilities to provide a completely new control package having a single pair of contacts.

What is claimed is:

1. A circuit interrupter comprising:
   an electrically insulating housing including a bottom wall;
   a circuit breaker having first and second separable contacts operable between open and closed positions;
   the circuit breaker including a trip mechanism having a releasable lever movable when released to a tripped position to cause automatic opening of the contacts;
   the first contact being mounted on a first arm coupled to the releasable lever;
   the second contact being mounted on a second arm of which at least a portion is substantially parallel to the first arm to cause current limiting repulsion of the contacts in response to a predetermined overcurrent condition;
   electromagnetic actuating means detachably connected to the second arm for moving the second contact between open and closed positions; and
   modular sensor means detachably connected for monitoring current flow and for automatically actuating the electromagnetic actuating means and the trip mechanism including the releasable lever in response to another predetermined overcurrent condition; whereby the circuit breaker is operable either with or without at least one of said means.

2. The circuit interrupter of claim 1 in which the bottom wall includes access means and the electromagnetic actuating means including linkage means for extension through the access means and connection with the second arm.

3. The circuit interrupter of claim 2 in which a panel is detachably mounted on the bottom wall to cover the access means when the electromagnetic actuating means is detached.

4. The circuit interrupter of claim 3 in which the linkage means includes a link connected to the second arm and a pin and pin-receiving slot to enable uninhibited movement of the second arm in response to current limiting repulsion between the contacts.

5. The circuit interrupter of claim 4 in which the assembly of the circuit breaker, modular sensor means, and electromagnetic actuating means comprises one pair of contacts.

6. A circuit breaker comprising:
   an electrically insulating housing including a bottom wall;
   a circuit breaker structure within the housing and including first and second separable contacts operable between open and closed positions;
   the structure also including a releasable lever movable when released to a tripped position to effect automatic opening of the contacts;
   the first contact being coupled to the releasable lever;
   the second contact being movable between open and closed positions when the first contact is in the tripped position of the releasable lever and spring-biased toward the first contact;
   electromagnetic actuating means for moving the second contact between open and closed position;
   modular sensor means for monitoring current flow for automatically tripping the trip mechanism including the releasable lever in response to a predetermined current condition; and
   the sensor means also automatically actuating the electromagnetic actuating means in response to another predetermined current condition.

7. The circuit breaker of claim 6 in which the modular sensor means is removably mounted for replacement by a modular sensor means of different current rating.

8. The circuit breaker of claim 7 in which the electromagnetic means is actuated in response to a control signal generated by the modular sensor means.

9. The circuit breaker of claim 3 in which the electromagnetic means is removably mounted for replacement by an electromagnetic means of a different current rating.

10. The circuit breaker of claim 9 in which the second contact is mounted on a retractable lever and the electromagnetic means being detachably connected to the retractable lever.

11. The circuit breaker of claim 5 in which the electromagnetic means includes a weighted bar pivotably movable between two positions corresponding to retractable and unretractable positions of the retractable lever so as to provide counterbalancing resistance to movement of the lever to ambient shock.

12. The circuit breaker of claim 11 in which the electromagnetic means includes a pivotal linkage having a pin and slot connection to enable overtravel between the retractable lever and the weighted bar.

13. A circuit interrupter comprising:
   a circuit breaker having first and second separable contacts operable between open and closed positions;
   the circuit breaker including a releasable lever movable when released to a tripped position to cause automatic opening of the contacts;
   the first contact being mounted on a first arm coupled to the releasable lever;
   the second contact being mounted on a second arm of which at least a portion is substantially parallel to the first arm to cause current limiting repulsion of the contacts in response to a predetermined overcurrent condition;
   electromagnetic actuating means detachably connected to the second arm for moving the second contact between open and closed positions; and
   modular sensor means detachably connected for monitoring current flow and for automatically actuating the electromagnetic actuating means and the trip mechanism including the releasable lever in response to overcurrent conditions.

14. The circuit interrupter of claim 13 in which the electromagnetic actuating means includes a linkage means having pin and pin-receiving-slot assembly for free movement of the second arm in response to a current limiting repulsion.

15. The circuit interrupter of claim 14 in which the linkage means includes a slotted link pivotally connected to a pin on the second arm.

16. The circuit interrupter of claim 15 in which the circuit breaker is contained within an insulating housing having a bottom wall through which the link extends.

17. The circuit interrupter of claim 14 in which one of the second arm and linkage means includes a pin and the other of which includes the pin-receiving-slot along which the pin travels in response to a current limiting repulsion.

* * * * *